Oct. 13, 1959

G. L. ROGERS 2,908,511

COUPLER ASSEMBLY

Filed Feb. 17, 1955

INVENTOR,
GERALD L. ROGERS

BY *Terry & Cohn*

ATTORNEYS.

INVENTOR,
GERALD L. ROGERS
BY Terry + Cohn
ATTORNEYS.

United States Patent Office 2,908,511
Patented Oct. 13, 1959

2,908,511

COUPLER ASSEMBLY

Gerald L. Rogers, Olivette, Mo., assignor to Stile-Craft Manufacturers, Inc., St. Louis, Mo., a corporation of Missouri Application February 17, 1955, Serial No. 488,793

5 Claims. (Cl. 284—1)

This invention relates generally to a coupler assembly, and has particular reference to an improved quick detachable coupler having a socket assembly adapted for wall mounting as a flush type outlet fixture.

The apparatus of the present invention has particular application and service in hospitals and laboratories or wherever it is desired to provide a number of conveniently located supply outlets for fluid and suction lines. Wall outlets for oxygen and vacuum, for example, are standard equipment in modern hospitals. It is the principal object of the present invention to provide improved wall outlet and coupling means whereby a hose may be quickly and simply plugged into a convenient fluid supply terminal assembly disposed in the building wall, and with equal facility unplugged therefrom.

An important object is directed to the provision of means which may be operated in an extremely simple manner to attach or detach the hose. The object is achieved by the provision of an improved coupling assembly whereby an operative connection is made by the simple expedient of inserting plug means on the hose fitting in the wall receptacle, and release is accomplished by a similar initially inward thrust of the hose terminal fitting. All that is required in both instances is a simple one hand manipulation of the hose fitting.

Another object is achieved in the provision of an improved wall outlet assembly including coupler sockets which are automatically closed and protected by a dust shield when not in service.

Other objects are directed to improved constructional provisions that greatly facilitate the work of installing a flush front outlet receptacle in a wall. This object is achieved by the provision of a fluid outlet terminal assembly which may be installed with the piping in an unfinished wall, and which includes a socket member which is adjustable to permit its forward end to be set in a predetermined position with respect to the surface of the finished wall. Usually, such position is substantially flush with the wall surface. My improved construction enables any irregularities in the mounting of the outlet assembly to be compensated for by simple adjustment of the socket member.

Yet another object is directed to improved constructional provisions that function automatically to close off the fluid supply at the outlet receptacle when the socket member is removed, as for purposes of replacing sealing gaskets or other elements which receive wear in use.

These and other objects and advantages will be more fully described in the following description setting forth a practical working embodiment of my invention.

Figure 1:
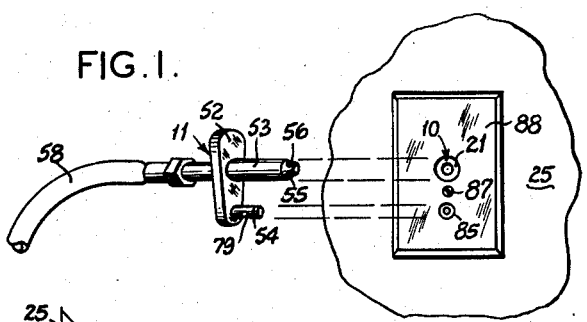
Fig. 1 is a perspective view of the hose terminal fitting, and a front elevational view of the flush type outlet.

Referring now by characters of reference to the drawings, the coupler assembly consists of a supply terminal assembly generally indicated at 10, and a hose terminal fitting referred to at 11.

The supply terminal assembly 10 includes a base member 12 constituting a fixed socket member having side flanges 13 (Fig. 3) secured by screws 14 to a receptacle box indicated by 15. The receptacle box 15 is located in a wall structure 16 (Fig. 2), and is usually secured in place by attachment to the studding. A longitudinal bore 17 is provided in base member 12, the bore 17 being closed at the inner end 20, and being open at the opposite outer end.

Figure 2:
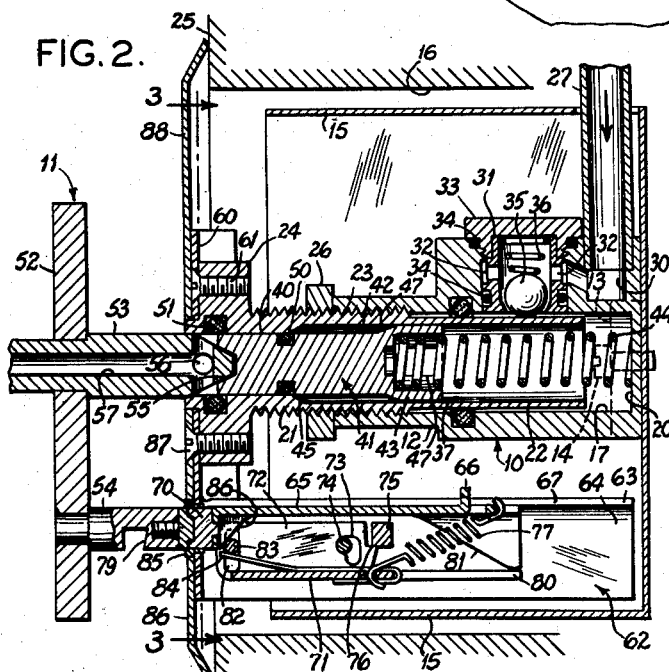
Fig. 2 is a cross sectional view of the coupler assembly mounted in a wall, and showing the parts in normal inoperative position.
Figure 3:
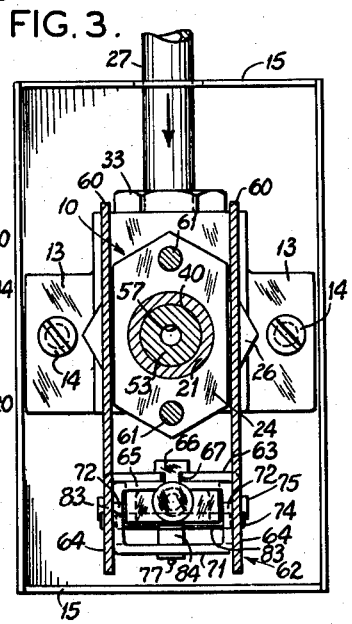
Fig. 3 is a view partly in cross section as seen along line 3—3 of Fig. 2.
Figure 4:
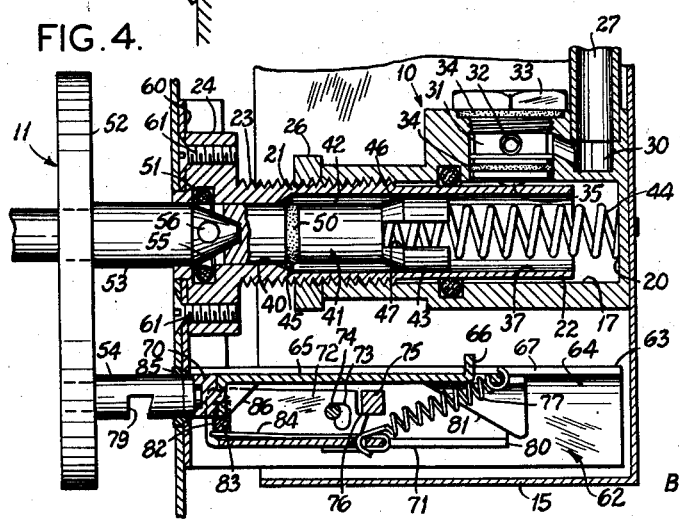
Fig. 4 is a cross sectional view of the coupler assembly, showing the hose terminal fitting as it is moved into the supply terminal assembly.

An extensible, tubular socket member 21, more clearly shown in Fig. 4 is received in longitudinal bore 17, and is carried by base member 12. The socket member 21 includes an inner portion 22 slightly spaced from the wall defining bore 17, a threaded portion 23 threadedly engaging base member 12, and a flanged outer head portion 24. After the base member 12 is fastened to receptacle 15, the socket member 21 is threadedly, longitudinally adjusted in bore 17 so as to dispose the forward head portion 24 at a predetermined position with respect to the surface 25 of wall 16. Usually, such position is in substantial alignment with surface 25 as is shown in Fig. 2, which realizes a flush wall fixture. Any irregularities in the mounting of the receptacle 15 and base member 12 can be compensated for by a simple adjustment of socket member 21. After socket member 21 is adjusted to the desired extended position, nut 26 threadedly carried on socket portion 23 is tightened against base member 12, thus securing the socket member 21 in such predetermined position.

A secondary valve means is utilized to place a supply pipe 27 selectively in communication with the bore 17 of base member 12. The supply pipe 27 passes through receptacle 15, and is placed in communication with a chamber 30 formed in base member 12. A hollow cage 31 is carried by base member 12, and is located at the side of bore 17. Lateral openings 32 place the inside of cage 31 in communication with chamber 30. A nut 33 is threadedly connected to base member 12, and is adapted to engage the clamp cage 31 in position. Elastic O-rings 34 provide an effective seal between base member 12 and nut 33 and cage 31. The wall defining bore 17 is provided with a port through which a valve element 35 carried internally of cage 31, extends for operative engagement with the inner end portion 22 of socket member 21. A compression spring 36 located in cage 31 tends to urge valve element 35 through the valve port, and toward a closed position.

It is seen that the valve port is held open when socket member 21 is in position, the inner end portion 22 holding valve element 35 in a retracted, open position. Thus, bore 17 is placed in communication with supply pipe 27 through chamber 30, opening 32, and thence through cage 31 and the valve port. When socket member 21 is removed from base member 12, the spring 36 urges valve element 35 inwardly to close the valve port, and thus automatically closes off the fluid supply.

As is shown in Fig. 4, the socket member 21 is provided with a longitudinal passage 37 having a reduced forward end portion 40. A primary valve element 41 is slidably carried by socket member 21 in passage 37. The valve element 41 consists of a reduced front portion 42 that closely interfits passage portion 40, and a head portion 43 that closely interfits the larger rear portion of passage 37.

The head portion 43 is recessed to receive and seat one end of a compression spring 44, the other end of the spring abutting the rear end 20 of bore 17. A valve seat or shoulder 45 is located in passage 37 and is adapted to abut a tapered shoulder 46 connecting the reduced front portion 42 and the head portion 43 of valve element 41. Slots 47 are formed laterally in head portion 43, and extend into shoulder 46, whereby to place the portion of passage 37 in front of head portion 43 in communication with the portion of passage 37 at the rear of the valve element 41 when shoulders 45 and 46 are separated.

When the coupler assembly is not in use, the spring 44 tends to urge valve element 41 forwardly to a closed position in which valve shoulder 46 abuts passage shoulder 45, and in which the front portion 42 of the valve element 41 extends to the end of socket member 21 to provide a dust shield. Elastic O-ring 50 carried by valve element 41, and O-ring 51 carried by the end of socket member 21 serve to prevent the fluid from passing between the reduced passage portion 40 and the reduced valve portion 42.

The hose terminal fitting 11 consists of a bridge piece 52 which carries a tubular valve plug 53 and a latch plug 54. One end of valve plug 53 is attached to a hose 58 (Fig. 1), while the other end is adapted to be inserted into the passage 37 of socket member 21. The innermost end 55 of valve plug 53 is tapered, and is provided with a series of openings 56 communicating with the bore 57 of the plug.

As valve plug 53 is inserted into passage 40 of socket member 21, the plug 53 depresses valve element 41 rearwardly against the compressive action of spring 44. When fully inserted, the tapered end 55 of plug 53 is located in the larger portion of passage 37 whereby to place the tubular plug 53 in communication with bore 17, and hence with supply pipe 27. The line of flow is from pipe 27, through the secondary valve means and into bore 17, thence into the portion of passage 37 located at the rear of valve head 43, through slots 47 into the forward portion of passage 37 at the front of valve head 43, and thence through openings 56 and into bore 57 of the valve plug.

A bracket 60 is fastened by screw 61 to the flanged outer head 24 of socket member 21. A latching unit, adapted to cooperate with latch plug 54 to provide a push-release type of latch mechanism, includes an elongate housing 62 carried by bracket 60, the housing 62 having an upper wall 63 and side walls 64. Slidably located in housing 62 is a plunger 65 having an outstruck T-lug 66 operable in an elongate guide slot 67 formed in wall 63. The front end of plunger 65 is attached to a guide element 70 that is movable through an opening constituting a socket in bracket 60 for engagement with the latch plug 54.

Also located in housing 62 is a latch arm 71 having side flanges 72. Pivot means including L-shaped slots 73 formed in flanges 72, and pivot pin 74 disposed in the slots 73 serve to mount latch arm 71 between side walls 64 of the housing. A non-circular bar 75 constituting a stop element is retained between walls 64, and normally engages a shoulder 76 formed on latch arm 71 and located at one side of pivot pin 74, when the latch arm 71 is disposed in the normal inoperative position. A tension spring 77 interconnects the latch arm 71 with the rear of plunger 65, and tends at all times to move arm 71 about pivot pin 74.

In the initial inoperative position of latch arm 71, as is shown in Fig. 2, the rear end 80 of the arm 71 engages the lowermost portion of camming ledges 81 formed on the rear of plunger 65. The forward end of latch arm 71 is provided with aligned elongate slots 82 formed in side flanges 72. A latch pin 83 is movably carried in slots 82. A leaf spring 84 fastened to latch arm 71 engages latch pin 83, and tends to urge the pin toward the path of movement of the plunger 65 and coacting latch plug 54. The pin 83 coacts with catch abutment 79 in plug 54 to lock the hose fitting to the supply assembly. When plunger 65 is located in its forwardmost position, the latch pin 83 engages camming shoulder 86 provided at the front end of plunger 65, and the guide element 70 extends through an annular bushing 85 in bracket 60 to provide an effective dust shield.

Since housing 62 is carried by socket member 21 by the interconnection of bracket 60, it will appear that the guide element 70 constituting the forward end of plunger 65 will be located at substantially the same predetermined position with respect to wall surface 25 as the front end of socket member 21 and of valve element 41. A cover plate 88 is secured to flanged outer head 24 of socket member 21 and to bracket 60 by screw 87. The cover plate 88 fits over the forwardmost end of socket member 21, and over bushing 85 to provide a substantially flush mounted wall fixture.

Figure 5:
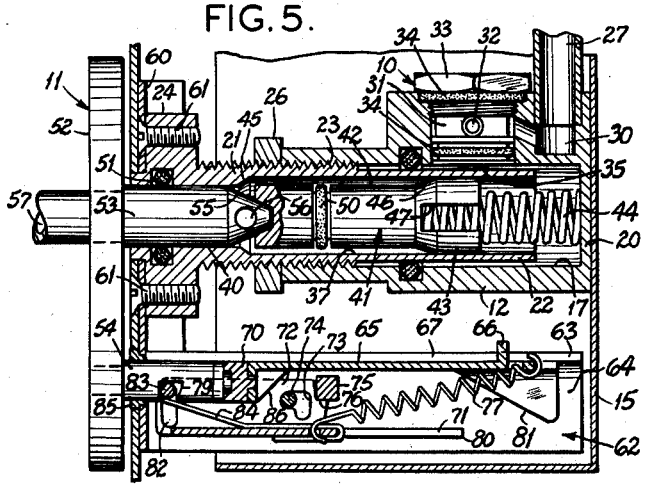
Fig. 5 is a cross sectional view of the coupler assembly showing the hose terminal fitting in its innermost position in which the latch pin moves into operative engagement with the latch plug.

To connect the hose fitting 11 to supply assembly 10, the valve plug 53 is inserted into the passage 40 of socket member 21, and latch plug 54 is inserted into bushing 85 of latch housing 62. As valve plug 53 is moved inwardly, the plug 53 depresses valve element 41 rearwardly against the action of spring 44. When the valve plug 53 is fully inserted, as is shown in Fig. 5, the forward end 42 of valve element 41 clears the close fitting reduced passage portion 40 of passage 37, and hence valve plug 53 is placed in communication with the bore 17 and supply pipe 27 through openings 56, all in the manner previously described.

As the latch plug 54 is moved inwardly, it depresses the plunger 65 rearwardly against the action of spring 77. As the plunger 65 is moved rearwardly, the latch pin 83 is cammed along slots 82 by shoulder 86 so as to ride over the front end of plunger 65 and the latch plug 54. This movement of latch pin 83 is clearly shown by the relative positions shown in Figs. 2 and 4. It is also seen that stop element 75 engaging ledge 76 prevents the latch arm 71 from being moved about pivot pin 74 by spring 77 as plunger 65 is depressed.

Figure 6:
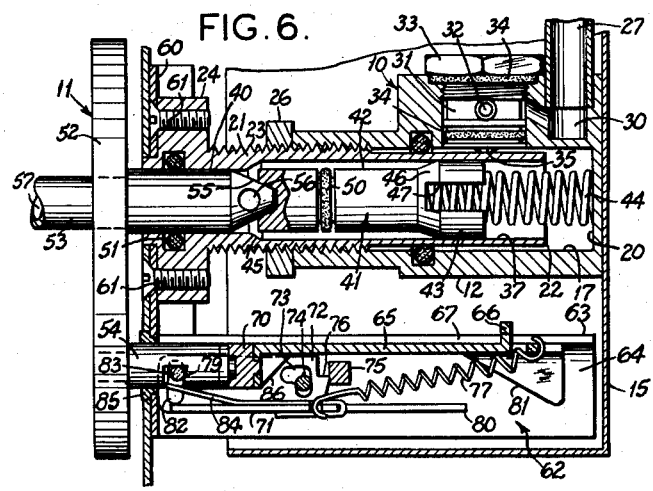
Fig. 6 is a cross sectional view of the coupler assembly showing the hose terminal fitting and supply terminal assembly operatively connected in the latched position.

When plunger 65 is fully depressed by latch plug 54, the latch pin 83 is moved along slots 82 by spring 84 toward the path of movement of plug 54, and into operative engagement with catch abutment 79. This position is shown in Fig. 5. Subsequently, the hose fitting 11 is moved slightly outwardly under the cooperative action of springs 44 and 77 to the position shown in Fig. 6. As the latch plug 54 moves outwardly to such position, the catch abutment 79 engages latch pin 83 and moves latch arm 71 forwardly to the position of Fig. 6. During this translatory movement of latch arm 71, the pivot pin 74 is moved relatively to the rear of one leg of the L-shaped pivot slots 73, which enables ledge 76 to clear and operatively disengage from stop element 75. Then, the tension force of spring 77 moves the rear end of latch arm 71 toward the plunger 65 so that pivot pin 74 is relatively moved into the other leg of L-shaped slots 73.

Figure 7:
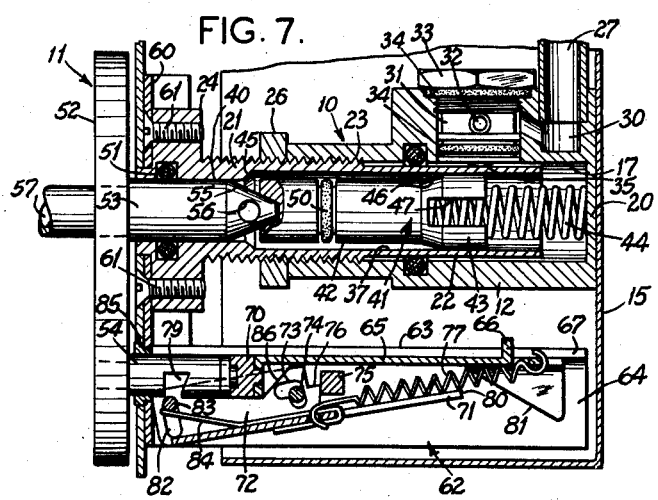
Fig. 7 is a cross sectional view of the coupler assembly showing the hose terminal fitting moved slightly inwardly in the supply terminal assembly, so as to disengage the latching mechanism.

To release the hose fitting 11, the fitting 11 is merely pushed inwardly to the extent shown in Fig. 7, whereupon latch pin 83 is moved out of operative engagement with abutment 79. The latch arm 71 and latch pin 83 are moved out of the path of plug 54 by the action of spring 77. As the latch plug 54 is removed, the plunger moves forwardly so that shoulder 81 engages the rear of latch arm 71, and hence serves to cam the arm 71 so that the pivot pin 74 is relatively moved into the other leg of slots 73. Then spring 77 acts to move the latch arm 71 rearwardly to the initial inoperative position shown in Fig. 2, in which the stop element 75 operatively engages ledge 76 of arm 71. Of course, upon withdrawal of hose fitting 11, the valve element 41 is moved forwardly to the closed position.

Under some circumstances and fields of usage, it becomes important that the hose fitting 11 should not rotate. For instance, containers may be attached in communication with the valve plug 53 for numerous purposes in laboratory and hospital uses, and of course, such containers must be retained in an upright vertical position. The latch plug 54 carried by bridge piece 52, and its cooperation with the latch unit carried by the supply terminal assembly 10, prevents the valve plug 53 from being rotated while in connected, operative assembly.

Further advantages are realized by the spacing of latch plug 54 from valve plug 53. It is possible to have a particular spacing in hose fittings between the latch and valve plugs which will permit the fittings to be connected only to certain supply outlets. For example, one such spacing will permit such hose fitting to be connected only to an oxygen outlet, while different spacing in another fitting will permit connection of such fitting only to supply outlets for suction lines. Thus, it is possible to prevent a particular hose fitting from being mistakenly connected to the wrong supply assembly.

Although the invention has been described by making detailed reference to a single preferred embodiment, such detail is to be understood in an instructive, rather than in any restrictive sense, many variants being possible within the scope of the claims hereunto appended.

I claim as my invention:

1. In a coupler assembly, a supply terminal assembly comprising a base member having a longitudinal bore, means for mounting said base member, a socket member carried by said base member and received in said bore, and having a passage communicating with said bore, said socket member being longitudinally adjustable on said base member to permit the forward end of said socket member to be located at a predetermined position, a valve means carried by and located in the passage of said socket member, said valve means being longitudinally adjustable relative to the base member upon adjustment of said socket member, a valve seat in said socket member, the valve means normally engaging said valve seat to close said passage, and a tubular plug adapted to be received in said socket member, the plug engaging said valve means to move the valve means away from the valve seat so as to open the passage and place said plug in communication with said bore.

2. In a coupler assembly, a supply terminal assembly comprising a base member having a longitudinal bore, means for mounting said base member, a tubular socket member received in said bore and carried by said base member, said socket member being longitudinally adjustable in said bore, whereby to permit the forward end of said socket member to be located at a predetermined position, a secondary valve means for placing the bore in communication with a supply pipe, said secondary valve means including a port in said base member and located immediately adjacent the side of said socket member, and a valve element engageable by said socket member, to normally hold said secondary valve means open, said valve element being adapted to close said valve port upon extension of said socket member from said bore, a primary valve means located in said socket member, and a tubular plug adapted to be received in said socket member, and adapted to actuate said primary valve means to place said plug in communication with said bore.

3. In a coupler assembly, a supply terminal assembly comprising a base member having a longitudinal bore, means for mounting said base member, a tubular socket member received in said bore and threadedly engaging said base member, said socket member having an inner end spaced from the wall defining said bore, said socket member being longitudinally adjustable in said bore, whereby to permit the forward end of said socket member to be located at a predetermined position, secondary valve means for placing the bore in communication with a supply pipe, said secondary valve means including a port located in the wall defining the bore, and located adjacent the side of the inner end of said socket member, and including a valve element actuated by said inner end to hold the secondary valve means open, means tending to move said valve element to a closed position upon extension of the tubular socket member from said bore, a second valve element carried by and located in said socket member, and a tubular plug adapted to be received in said socket member, and adapted to actuate the second valve element to place said plug in communication with said bore.

4. In a coupler assembly, a supply terminal assembly comprising a base member having a longitudinal bore, means for mounting said base member, a tubular socket member received in said bore and carried by said base member, said socket member being longitudinally adjustable on said base member, whereby to permit the forward end of said socket member to be located at a predetermined position, said socket member being provided with a longitudinal passage communicating with said bore, a valve element operable in said passage, a valve seat in said socket member, the valve element normally engaging said valve seat to close said passage, said valve element in its closed position extending to the forward end of the socket member, the passage and valve element being of relatively tight fit at said forward end to provide a dust shield, and a tubular plug adapted to be received in said passage, and engaging said valve element to move the valve element away from said seat so as to open the passage to place said plug in communication with said bore.

5. In a coupler assembly, a supply terminal assembly having a valve plug-receiving means and a latch plug-receiving means disposed in a predetermined fixed spaced relation, a hose terminal fitting including a valve plug adapted to interfit said valve plug-receiving means, a bridge piece fastened to said valve plug, and a latch plug fastened to said bridge piece and adapted to interfit said latch plug-receiving means, the latch plug being disposed in a fixed spaced relation to the valve plug by said bridge piece.

References Cited in the file of this patent

UNITED STATES PATENTS

| | | |
|---|---|---|
| 286,954 | Murphy | Oct. 16, 1883 |
| 1,666,629 | Lumley | Apr. 17, 1928 |
| 2,115,195 | Cole | Apr. 26, 1938 |
| 2,526,754 | Johnson | Oct. 24, 1950 |
| 2,619,367 | Hanson | Nov. 25, 1952 |
| 2,637,576 | Nottingham | May 5, 1953 |
| 2,771,308 | Vitcha et al. | Nov. 20, 1956 |

FOREIGN PATENTS

| | | |
|---|---|---|
| 545,176 | France | July 13, 1922 |